United States Patent [19]

Baadsgaard

[11] 4,021,527
[45] May 3, 1977

[54] PRODUCTION OF SODIUM CARBONATE

[75] Inventor: Marinus J. Baadsgaard, Green River, Wyo.

[73] Assignee: Intermountain Research and Development Corporation, Green River, Wyo.

[22] Filed: July 16, 1975

[21] Appl. No.: 596,484

[52] U.S. Cl. .................. 423/206 T; 23/302 T; 210/20; 210/39
[51] Int. Cl.² ................ C01D 7/12; B01D 15/00
[58] Field of Search .......... 423/421, 206 T; 23/302 T; 210/20, 39, 40

[56] References Cited
UNITED STATES PATENTS

| | | | |
|---|---|---|---|
| 2,346,140 | 4/1944 | Pike | 423/206 T |
| 2,770,524 | 11/1956 | Seaton et al. | 423/421 |
| 2,962,348 | 11/1960 | Seglin et al. | 423/206 T |
| 2,989,369 | 1/1961 | Osborne | 423/206 T |
| 3,260,567 | 7/1966 | Hellmers et al. | 423/206 T |
| 3,455,647 | 7/1969 | Gloster | 423/206 T |
| 3,528,766 | 9/1970 | Coglati, Jr. et al. | 423/206 T |
| 3,927,175 | 12/1975 | Garofano | 423/421 |
| 3,933,977 | 1/1976 | Ilardi et al. | 423/206 T |

Primary Examiner—O. R. Vertiz
Assistant Examiner—Gary P. Straub
Attorney, Agent, or Firm—Frank Ianno; Eugene G. Seems; Pauline Newman

[57] ABSTRACT

Method of preparing refined, dense soda ash from crude trona by calcining the crude trona to crude sodium carbonate, mixing the crude sodium carbonate with an aqueous solution of soda ash or water to form a substantially saturated crude sodium carbonate solution containing coarse and fine insolubles, clarifying the crude sodium carbonate solution, passing the clarified sodium carbonate solution upwardly through an expanded carbon bed to remove organic impurities, evaporating the carbon-treated sodium carbonate solution to crystallize sodium carbonate monohydrate crystals, separating the sodium carbonate monohydrate crystals and calcining them to dense soda ash.

4 Claims, 1 Drawing Figure

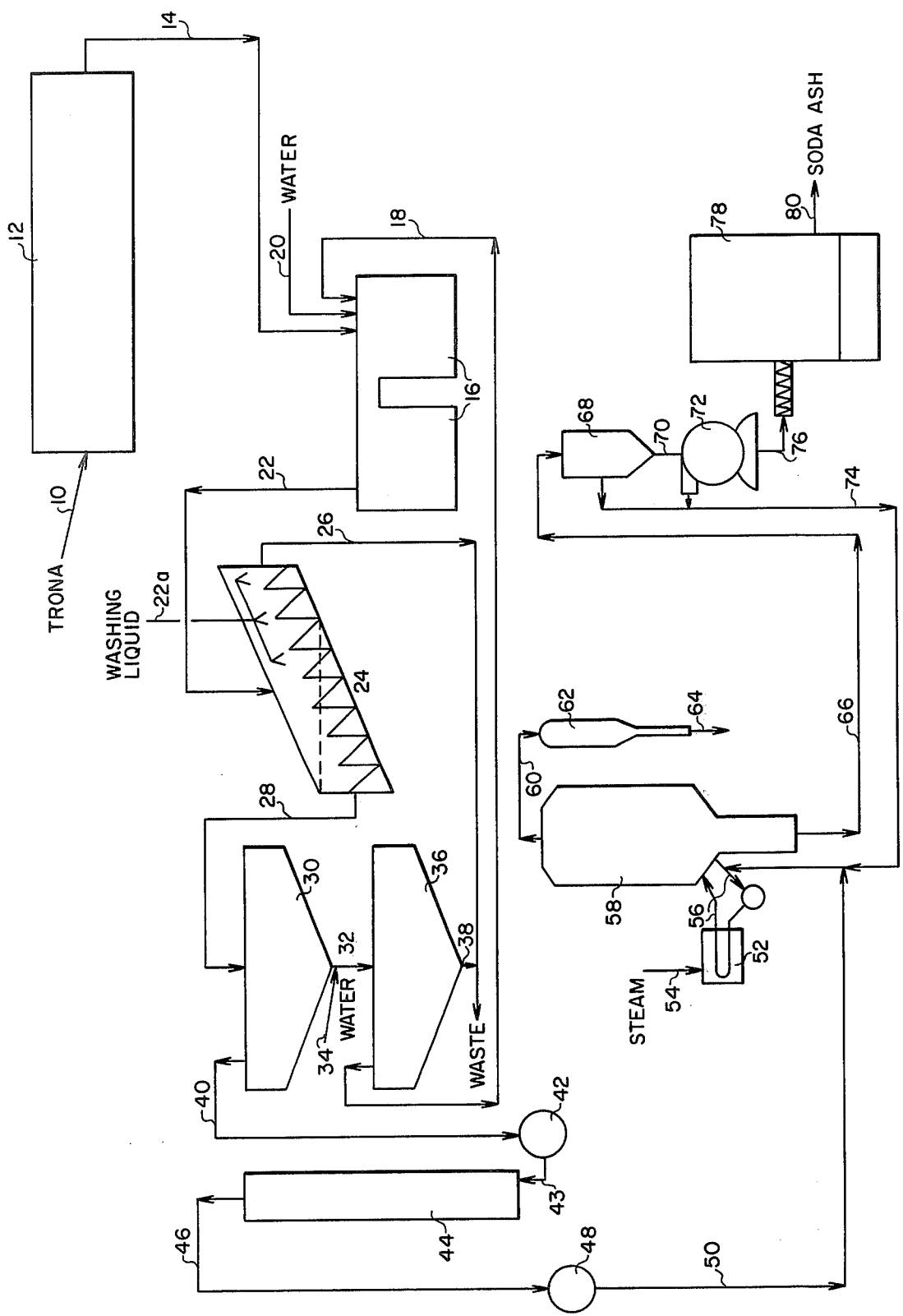

PRODUCTION OF SODIUM CARBONATE

This invention relates to an improved process for the production of sodium carbonate (soda ash) from crude trona.

In Sweetwater and adjacent counties in the vicinity of Green River, Wyoming, trona deposits are found at depths ranging from about 800 to 1800 feet underground. The main trona bed varies from 8 to 18 feet in thickness, and other beds of less thickness separated by layers of shale are usually found above the main trona bed. The trona consists chiefly of sodium sesquicarbonate ($Na_2CO_3 \cdot NaHCO_3 \cdot 2H_2O$) and about 4 to 12% insoluble materials consisting mainly of shale. A typical analysis of the crude trona from which the larger pieces of shale have been removed is:

| Constituent | Percent |
|---|---|
| $Na_2CO_3$ | 43.51 |
| $NaHCO_3$ | 36.11 |
| $H_2O$ | 13.14 |
| $Na_2SO_4$ | 0.02 |
| NaCl | 0.08 |
| $Fe_2O_3$ | 0.14 |
| Organic Matter | 0.30 |
| Insolubles | 6.70 |

Various processes for the production of sodium carbonate from crude trona are known. One such process is the sodium carbonate monohydrate process. In this process crude trona, after being crushed and screened, is calcined directly to form crude sodium carbonate. This crude calcinate is dissolved in an aqueous solvent to form a substantially saturated solution of sodium carbonate which is then clarified, and subsequently filtered to remove fine insolubles. The resulting clarified solution is then partially evaporated to crystallize and separate sodium carbonate monohydrate crystals which are then calcined to a dense soda ash. This process is described in detail in U.S. Pat. No. 2,962,348, issued to Seglin et al on Nov. 29, 1960. A subsequent modification of this process is the installation of carbon columns to treat the clarified sodium carbonate solution with activated carbon in order to remove organic impurities, principally soluble organic compounds, in the final product.

One difficulty that has arisen in the operation of the monohydrate process, as defined above, has been in the operation of the carbon columns whose function is to remove organic impurities from the clarified crude sodium carbonate solution. In a typical operation, the crude sodium carbonate solution is passed through one or more carbon columns each of which contains a bed of activated carbon particles suspended on a support, such as a screen or perforated plate. As the clarified sodium carbonate solution passes through the bed, organics are adsorbed on the activated carbon. The carbon treated solution is then removed from the carbon bed substantially reduced in organic impurities. Unfortunately, as the crude sodium carbonate solution passes through the carbon bed, insoluble salts and any unfiltered particles deposit on the carbon granules. In time, these deposits commence blocking the normal passages through the carbon bed and increase the pressure drop between the solution entering and leaving the bed at a given rate. The pressure drop increases with added deposits until they eventually plug the column entirely and little or no solution can be passed through the bed.

Since the deposition of insolubles which tend to plug the carbon bed occur principally at the entry point of the clarified sodium carbonate solution into the bed, it has been the custom to periodically remove portions of the carbon at that end of the column where solution enters the bed and replace the carbon which is removed with fresh carbon which is added to the opposite end of the fixed bed. The removed carbon containing the major proportion of deposits is then treated to remove such deposits for recovery and recycle of the carbon when possible. If the salts are particularly persistent and cannot be removed by normal treatment, the encrusted carbon must be discarded.

As a result, it has been desired to carry out the monohydrate process in a manner which will effect a more efficient removal of organic impurities from the clarified sodium carbonate solution without the need for constant shutdown to permit removal and replacement of carbon which has been encrusted with deposits from the solution being treated.

It has now been found that an improved process for producing dense soda ash from crude trona can be achieved by calcining crude trona to obtain crude sodium carbonate, mixing the crude sodium carbonate with an aqueous solution of soda ash or water to form a substantially saturated solution of crude sodium carbonate containing coarse and fine solids, separating coarse solids from the resulting crude sodium carbonate solution, clarifying crude sodium carbonate solution, passing the clarified sodium carbonate solution upwardly through an expanded carbon bed and removing organic impurities, evaporating the clarified, carbon treated sodium carbonate solution to crystallize sodium carbonate monohydrate crystals therefrom, separating the sodium carbonate monohydrate crystals from their mother liquor and calcining the separated crystals to produce dense soda ash.

In the drawing, there is illustrated diagrammatically an embodiment for the production of soda ash from trona by the present process.

In the process of the present invention crude trona is dry-mined and processed to crude sodium carbonate by calcining and converting the sodium sesquicarbonate present in the crude trona to sodium carbonate. This reaction may be presented as follows:

$$2(Na_2CO_3 \cdot NaHCO_3 \cdot 2H_2O) \rightarrow 3Na_2CO_3 + 5H_2O + CO_2$$

The crude, dry-mined trona may be prepared for calcination by crushing the mined trona and passing it over a screening device or other suitable separating equipment, whereby particles in the general size range smaller than one-half inch are collected and passed to the calciner. Rejected oversize particles may then be recycled to the crushing apparatus for further crushing and screening. Proper sizing of the crude trona insures good conversion of sodium sesquicarbonate therein to sodium carbonate, since oversized particles are not easily converted in the calciner.

The calcination of the crude trona is necessary in order to convert the sodium bicarbonate values present in the crude trona to sodium carbonate. In addition, the crude sodium carbonate resulting from the calcination has a greater rate of solubility than the crude trona. A further result of calcination is that calcium salts and other difficultly soluble material in the insoluble fraction are rendered even less soluble. The increase in the rate of solubility of the crude sodium carbonate results in shorter dissolving time and a greater saving in the dissolving equipment size so that large production rates of soda ash can be obtained in small vessels. Additionally, the shorter dissolving time results in less dissolving of calcium carbonate present in the insoluble fraction of the trona.

The calcination may be carried out at any temperatures sufficiently high to convert the trona to sodium carbonate, e.g. 150°–800° C. However, since carbon treatment for organic removal is to be employed subsequently in the process, it is preferred to use lower calcination temperatures on the order of 150° to 350° C, and preferably 150° to 170° C. Carbon treatment is utilized in a subsequent stage to remove any organic matter present in the calcined trona which is carried over into the process solutions. The retention time of the crude trona in the calciner is a function of the particle size and the temperature of the calciner. At a temperature of 150°–200° C a period of about 20 minutes has been found satisfactory to obtain proper calcination of the crude trona.

The calcination is usually carried out in a rotary, direct fired kiln, although other types of kilns, such as vertical kilns or grate type calciners, are equally suitable.

After the crude trona is calcined, it is passed to a dissolving stage (dissolver) where hot water or a hot dilute solution of sodium carbonate is used to form an aqueous solution of the sodium carbonate values in said calcined crude trona. Any water may be used for dissolution, but preferably it is softened and contains some dissolved sodium carbonate therein, on the order of 6% by weight or more. In a preferred operation the major quantity of liquor used for dissolving the crude soda ash (dissolver influent liquor) is recycled from a subsequent stage of the process (thickener stage) and contains sodium carbonate values dissolved therein.

The addition of hot, crude sodium carbonate from the calciner to hot dissolver influent liquor may heat the resulting solution above its boiling point so that steam is formed and escapes from the dissolvers used in the dissolving system thereby requiring more water than that theoretically required for solution of crude sodium carbonate. It is preferred that the water in the dissolver influent liquor contain no more than 170 ppm total hardness, expressed as calcium carbonate, since this avoids the precipitation of calcium carbonate in the dissolvers. Calcium carbonate precipitation is most undesired because it forms scale and presents problems in the removal of the scale from the dissolver equipment.

When anhydrous sodium carbonate or calcined crude trona is introduced into water or into a solution of sodium carbonate in water at a temperature above 95° F (35° C) and below 230° F (110° C) it hydrates to sodium carbonate monohydrate. If the solution is unsaturated the sodium carbonate monohydrate dissolves. If the solution is saturated the sodium carbonate monohydrate does not dissolve.

The effluent from the dissolver is a substantially saturated solution of sodium carbonate plus suspended insolubles such as shales and undissolved sodium carbonate monohydrate, which in our preferred process, is then passed to a coarse solids classifier. In the classifier the coarse solids, on the order of about plus 40 mesh, are separated from the crude sodium carbonate solution and any undissolved or suspended insolubles smaller than about 40 mesh which may be present therein.

It is preferred to utilize as the coarse solids classifier one in which a conveying means such as a screw is mounted in a liquid-tight elongated container mounted at an inclined angle from the horizontal, e.g. 10°–60°. The inclined screw is completely covered at its lower end with the slurry to be treated and the upper end of the screw extends beyond and out of the slurry which is present in the classifier. Such a typical classifier is the Denver Equipment Company Spiral Classifier Model 125.

In the operation of this classifier, the crude sodium carbonate solution from the dissolver is fed into the intake opening located approximately at the center of the classifier. The coarse solids sink to the bottom of the classifier because of their heavier weight relative to the finer insolubles. The inclined screw picks up the heavier particles resting on the bottom of the classifier and conveys them upwardly out of the solution towards a discharge chute for the coarse solids located at the top of the classifier. The fine particles and the remaining sodium carbonate solution migrate to the lower end of the classifier and are removed and passed to a clarifier.

The effluent from the coarse solids classifier is, preferably, a substantially saturated solution of sodium carbonate containing suspended insoluble fines, for example no larger than 40 mesh, and is passed to a clarifier where the fine insolubles (minus 40 mesh) and muds are permitted to settle out. If a small amount of fine solid matter remains suspended in the liquor after passing the carbonate solution through the clarifier, the liquor may be filtered to remove remaining insoluble fines.

The overflow liquor from the clarifier, pregnant with sodium carbonate, is then passed upwardly through a carbon column containing an expanded bed of activated carbon. The carbon treatment removes soluble organic impurities present in the sodium carbonate liquor to prevent the impurities from being carried through to the final soda ash product.

The term "expanded bed of activated carbon" refers to vertical beds of carbon that are supported at their base on a fixed support, such as a screen or perforated disk, and in which the solution to be purified is passed upwardly through the bed with sufficient velocity to expand the size of the bed to at least 5% expansion over its static state within the carbon containing column. This requires that sufficient freeboard be available above the carbon bed to permit the desired expansion. It should be stressed, however, that the velocity used in the bed is not of sufficient strength to produce what is commonly termed in the art as a "fluidized bed" in which the entire bed is in a fluidized, suspended state in which each particle in the bed is supported by the upflowing fluid in a freely moving state. A carbon bed in a fluidized state will not remove organic impurities efficiently. To illustrate typical expanded beds, Table 1 below shows the typical percent of bed expansion obtained at the superficial velocity specified in the Table.

TABLE 1

| Percent Bed Expansion | |
|---|---|
| Superficial Velocity of Bed (gpm/sq.ft.) | Percent Bed Expansion |
| 0.9 | 5 |
| 2.0 | 10 |
| 2.9 | 15 |
| 3.7 | 20 |
| 4.5 | 25 |

In this expanded state, the bed of activated carbon is effective in removing organic impurities from the solution passing through the bed, but any insoluble deposits do not cause pluggage of the column and, therefore, the pressure drop through the column, from the point of entry to the point of exit, does not increase to the point where the carbon column must be shut down and the carbon replaced.

The carbon-treated sodium carbonate solution is then passed to an evaporating and crystallizing stage where water is evaporated from the sodium carbonate solution by heating and sodium carbonate monohydrate is crystallized from the solution. The sodium carbonate monohydrate crystal slurry is then passed to a concentrator where it is treated to remove most of the mother liquor which remains on the crystals. The moist crystals are then passed to a centrifuge so that essentially all the mother liquor is removed. Thereafter the crystals are heated in a dryer at a temperature of 105° to 125° C to convert the sodium carbonate monohydrate crystals to anhydrous soda ash. Dehydration of the sodium carbonate monohydrate permits recovery of a dense form of soda ash having a bulk density on the order of about 60 pounds per cubic foot.

Referring now to the drawing; the drawing illustrates diagrammatically an embodiment of the invention for production of soda ash from calcined trona.

In the drawing the crude trona, crushed to a general size range of less than one-half inch is fed by conduit 10 to a calciner 12 where the crude trona is converted to crude sodium carbonate by heating at elevated temperatures, preferably at temperatures on the order of 150° to 350° C, more preferably at 150° to 170° C. The calciner 12 illustrated in the drawing is a direct fired calciner, although other known calciners can also be employed, and the gaseous products of reaction, namely water and $CO_2$, are removed from the calciner and vented by means not shown.

The crude sodium carbonate recovered from calciner 12, with or without cooling, is passed through line 14 to dissolvers 16 where the sodium carbonate is dissolved in a hot dissolver influent liquor supplied through line 18 to form a substantially saturated solution of the sodium carbonate. The influent liquor may be water, preferably softened water supplied through line 20, and more preferably recycled solution supplied through line 18, from the thickener stage 36 of the process. In the preferred embodiment of the invention the dissolver influent liquor used for dissolving sodium carbonate contains at least 6% of sodium carbonate dissolved therein such that the total hardness of the liquor is less than 170 ppm total hardness, calculated as calcium carbonate. This liquor is normally supplied through line 18 from the thickener 36 but can also contain some makeup water through line 20, preferably softened makeup water. Dissolution of the sodium carbonate in the dissolver normally takes place with a hot solution at temperatures on the order of 85° to 95° C.

The crude sodium carbonate solution and suspended solids are removed through line 22 and passed into a coarse solids classifier 24. In classifier 24 the coarse solids, that is solids of at least about 40 mesh, fall to the bottom of the classifier and are passed upwardly by means of the revolving screw in the classifier. The sodium carbonate solution and the finer particles, that is particles having a size smaller than about 40 mesh, flow towards the base of the classifier and are removed through line 28. As the coarse solids are removed from the liquid layer present in classifier 24 the solids are sprayed by means of spray heads 22A with a washing liquid which may be water or a dilute sodium carbonate solution, to free the solids from saturated sodium carbonate solution which is retained on the surface. The washing liquid after contacting the solids now contains increased sodium carbonate values and is mixed with the sodium carbonate solution at the base of the classifier 24. The washed solids removed through line 26 are sent for disposal. The sodium carbonate solution, containing only insoluble fines is removed through line 28 and passed to clarifier 30.

In clarifier 30 the sodium carbonate solution, free of coarse solids, remains in a substantially quiescent stage. The insoluble fines settle and a sludge forms at the bottom of the clarifier which is removed by a rotating rake and passed to a thickener through line 32. Makeup water to the process may be added through line 34 and mixed with the muds from the classifier 30 in thickener 36 to soften the makeup water. The insoluble fines and muds settle in thickener 36 and are removed by line 38 to waste. Water which has been softened and which contains sodium carbonate values, preferably above 6% by weight, is then removed from the thickener and is passed through line 18 to dissolver 16 for use in dissolving crude sodium carbonate.

The relatively clear solution that overflows from the clarifier 30 through line 40 is passed to the filter 42 to remove any suspended solids remaining in the liquor. The clarified sodium carbonate solution is then passed through line 43 into an expanded carbon column 44 to remove soluble organic impurities. The carbon-treated sodium carbonate solution is then passed through line 46 into a polish filter 48 to remove any additional fines or carbon particles.

The purified sodium carbonate solution is passed through line 50 into an evaporator 58. The sodium carbonate solution enters a recycle circuit 56 which flows into a heat exchanger 52, for heating solution passing through this exchanger. The heat exchanger 52 is supplied with steam 54 in order to supply heat to the solution circulating in the recycle stream 56. The heated solution is then passed into the evaporator 58 where a portion of the water is evaporated and is removed through line 60 and condensed in condenser 62. As a result of the evaporation, sodium carbonate monohydrate is crystallized and a crystal slurry is removed through line 66. The condensed water 64 removed from condenser 62 can be piped to cooling towers or can be used as softened makeup water, as desired.

The sodium carbonate monohydrate crystal slurry removed through line 66 is passed into concentrator 68 to remove the bulk of the mother liquor remaining on the sodium carbonate monohydrate crystals. A more concentrated crystal slurry is removed from concentrator 68 through line 70 and is then passed into a centrifuge 72 where very small amounts, on the order of 3% or so of mother liquor, remain on the sodium carbonate monohydrate crystals. The mother liquor which is removed from concentrator 68 and centrifuge 72 are combined, and recycled through line 74 to the purified sodium carbonate solution 50 which is fed to the evaporator. The centrifuged sodium carbonate monohydrate crystals are removed from centrifuge 72 through line 76 and passed into a dryer 78 where the sodium carbonate monohydrate crystals are converted to sodium carbonate and removed through line 80 as product. The dryer 78 is heated at a temperature sufficient to convert the sodium carbonate monohydrate to soda ash, for example 105° to 125° C, and may be in the form of a fluid-bed dryer, rotary kiln dryer or the like. As a result of converting the sodium carbonate monohydrate to soda ash the resulting soda ash product is recovered as a high density material having a bulk density of about 60 pounds per cubic foot.

The following example is given to illustrate the invention and is not intended to be limiting thereof.

EXAMPLE

Run A – Process of the Invention

The process employed was that set forth in the drawing in which a clarified solution of sodium carbonate was passed upwardly through an expanded bed of activated carbon at a rate of 2.11 gallons per minute per square foot of bed for a period of 30 days. The initial pressure drop across the column was 26 psig. At the end of 30 days of operation, the pressure drop was still below 40 psig.

Run B – Prior Art

The above was repeated except that the clarified sodium carbonate solution was run through a packed carbon column at a rate of 3.16 gallons per minute per square foot of bed. However, the bed could not be expanded because it was held in place by screens and had no freeboard above the bed. The pressure drop across the bed of carbon is set forth below.

| Days of Operation | Pressure drop, psig |
|---|---|
| 1 | 67 |
| 2 | 71 |

| Days of Operation | Pressure drop, psig |
|---|---|
| 8 | 104 |
| 9 | 107 |
| 16 | 146 |

As will be observed from the above examples, the prior art method (Run B) after operating for 8 days resulted in a pressure drop that was greater than that obtained after 30 days operation with the method of the present invention.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Process for preparing dense sodium carbonate from trona which comprises calcining crude trona to obtain crude sodium carbonate, mixing the crude sodium carbonate with an aqueous liquor to form a solution of crude sodium carbonate containing coarse and fine solids, clarifying the crude sodium carbonate solution, passing the clarified sodium carbonate solution upwardly through an activated carbon bed at a flow velocity sufficient to provide at least a 5% expansion of said bed over its static state, but wherein said velocity is insufficient to form a fluidized bed, to remove organic impurities, evaporating the clarified carbon-treated sodium carbonate solution to crystallize sodium carbonate monohydrate crystals therefrom, separating said sodium carbonate monohydrate crystals from their mother liquor and calcining the separated crystals to produce dense soda ash.

2. Process of claim 1 wherein the crude trona is calcined at temperatures of from about 150° to 350° C.

3. Process of claim 2 wherein said expanded bed of activated carbon has 5% to 25% expansion over its static state.

4. Process of claim 1 wherein said clarified sodium carbonate solution is passed through said expanded bed of activated carbon at a rate of from about 0.9 to 4.5 gallons per minute per square foot of bed.

* * * * *